UNITED STATES PATENT OFFICE.

ANDRÉ BROCHET, OF PARIS, FRANCE.

PROCESS OF PRODUCING ALCOHOLS BY HYDROGENATION.

1,247,629.  Specification of Letters Patent.  Patented Nov. 27, 1917.

No Drawing.  Application filed July 16, 1913. Serial No. 779,298.

*To all whom it may concern:*

Be it known that I, ANDRÉ BROCHET, of 30 Avenue des Gobelins, in the city of Paris, Republic of France, have invented a Process of Producing Alcohols by Hydrogenation, of which the following is a full, clear, and exact description.

The present invention has for its object the production of alcohols, by hydrogenation of products such as aldehydes, ketones, and phenols.

The present invention consists in mixing a non-precious catalytic metal with the material to be treated, and causing hydrogen to act thereupon, while vigorously mixing the material and catalyst.

The catalytic metal may be deposited or not upon a suitable carrier, such as is in common use in the art.

The material to be treated may be in a liquid condition either by its own constitution, or by fusion, or by solution in an appropriate solvent; the present process may also be used in the case that a solid material is to be treated, which is maintained suspended in a state of fine division in a convenient vehicle.

The process is carried out under some pressure, but in most cases the absorption of the hydrogen is effected so thoroughly that if there is an insufficient quantity of this gas for producing the total reaction a considerable vacuum will be found to exist in the apparatus.

It will therefore be understood that certain reactions may be realized, according to the present invention, without the necessity of operating under pressure, but, in a general way, its use is preferable, as it allows of accelerating the reaction.

The catalyzing metal may be nickel, cobalt, iron, etc., each of which act with a different degree of activity. These substances are hereinafter referred to as "a catalytic metal having an atomic weight between 55 and 59."

The renewing of the surfaces of contact between the gas and the metal impregnated with the reacting liquid must be very frequent. This renewing of the surfaces can be obtained, according to circumstances, by tossing of the apparatus, agitation of the liquid, splashing of the gas, pulverization of the liquid, injection of the liquid by means of the gas or in any other manner.

The present process may be effected at a moderate temperature, for example a temperature not over 200° C., and under such conditions that fixation of hydrogen is effected, without the liberation of water, and thus it is possible, for example to obtain benzyl alcohol from benzaldehyde, and to obtain alpha phenylethyl alcohol (methyl phenyl carbinol) from acetophenone, reactions that have not heretofore been possible to realize, by the known methods of catalytic hydrogenation, by means of the known precious metals. Also, phenol may also be entirely converted into cyclohexanol and, on account of the low temperature of reaction, there is not any formation of cyclohexen, or cyclohexenone.

Moreover, the present process offers a considerable advantage by the fact that it is possible, considering an operation effected in the above mentioned conditions, to transform this operation by the use with the catalyzers above referred to, of other substances capable of acting as catalyzers of second order (sometimes referred to as "promoters"), by means of which it will be possible, for instance, to vary the time required for the reaction, or as reagent acting on the nature of the medium and by means of which it will be possible to neutralize, acidify or alkalize this medium or produce any modification allowing to alter the progress of the reaction.

The present process also presents the following advantages:

1. It permits of the utilization of the hydrogen at a temperature which may be much lower than the boiling point of the product treated, which affords the advantage that, on the one hand, products non-volatile at the reaction temperature can be employed, while on the other hand hydrogenation can be effected at a far lower temperature than in the known methods. It is therefore possible either to obtain products that have never hitherto been obtained or to avoid the formation of certain other products, and by suitably selecting the temperature for the operation, it is also possible to obtain the desired body in a state of great purity. In the case of phenol, for example, the hydrogenation takes place below 100° C.

2. Products infusible at the reaction temperature but soluble either in water or in an appropriate liquid, such as ethylic alcohol, amylic alcohol, cyclo hexanol, glycerin and so forth, or insoluble products maintained in suspension in a vehicle can also be hydrogenerated.

3. It permits of modifying the progress of the reaction by addition of reagents for altering the nature of the mediums neutralizing, acidifying, alkalyzing it, etc., or for changing the time required for the reaction by the use of catalyzers of second order.

By way of example, hereinafter will be described a particular manner of putting the process into effect, for the purpose of producing cyclohexanol by hydrogenating phenol.

Example: 1% of reduced nickel (obtained by the reduction of the oxid, carbonate, or the like, is added to phenol. It is placed in an apparatus heated to approximately 100° to 120° C. and subjected to the action of hydrogen acting at a pressure of from 10 to 15 kilograms per square centimeter. Agitation is effected in such a manner as frequently to renew the contacts between the gas and the metal suspended in the phenol. The hydrogen is absorbed; if the supply of hydrogen is cut off, the apparatus having previously been exhausted of air, it is found that a vacuum forms in the apparatus. The phenol is transformed, substantially quantitatively, into cyclohexanol. As above set forth, by reason of the low reaction temperature, neither the formation of cyclo hexene nor of cyclo hexanone is observed. The filtered liquid is subjected to distillation and the catalyzer is utilized for a fresh operation.

The process of producing alcohols by hydrogenating may also be effected by employing aldehydes and ketones, as starting materials as above explained.

What I claim is:

1. A process of producing alcohols by hydrogenation of an aromatic hydrocarbon derivative having a hydroxy group, which comprises bringing the body to be treated into a liquid condition, mixing therewith a catalytic metal having an atomic weight between 55 and 59 and causing hydrogen to act thereupon, while frequently renewing the contact surfaces.

2. A process of producing alcohols by hydrogenation of an aromatic hydrocarbon derivative having a hydroxy group, which comprises bringing the body to be treated into a liquid condition, mixing therewith a catalytic metal having an atomic weight between 55 and 59 and causing hydrogen to act thereupon, while energetically agitating the reacting mass.

3. A process of producing alcohols by hydrogenation of an aromatic hydrocarbon derivative containing a hydroxy group, which comprises bringing the said material into a liquid condition, mixing therewith a catalytic metal having an atomic weight between 55 and 59, and treating the same with a gas mixture containing free hydrogen, while vigorously stirring the reacting mass.

4. A process of producing alcohols by hydrogenation of aromatic hydrocarbon derivatives containing a hydroxy group, which comprises suspending the said material in an appropriate inert liquid vehicle, and treating the mixture thereby produced with a hydrogen-containing gas, in the presence of a catalytic metal having an atomic weight between 55 and 59, while energetically agitating the mass.

5. A process of producing alcohols by hydrogenation of an aromatic hydrocarbon derivative containing a hydroxy group, which comprises bringing the said material into a liquid condition, mixing therewith a catalytic metal having an atomic weight between 55 and 59, and treating the same with a gas mixture containing free hydrogen, while vigorously stirring the reacting mass, at a temperature not exceeding 200° C.

6. A process which comprises reacting upon a phenol in a liquid condition with hydrogen, in the presence of a catalytic metal having an atomic weight between 55 and 59.

7. A process which comprises reacting upon a phenol in a liquid condition with hydrogen, in the presence of a catalytic metal having an atomic weight between 55 and 59, at a temperature of not over 120° C.

8. A process which comprises reacting upon a phenol dissolved in a suitable solvent, in the presence of a metal catalyst having an atomic weight between 55 and 59, with free hydrogen at a temperature of not over 200° C., and under a pressure of about 10 to 15 atmospheres.

9. A process which comprises reacting upon a phenolic body, in the presence of a nickel catalyst with hydrogen gas, at a temperature of about 120° C., while vigorously agitating the reacting mass.

10. A process which comprises hydrogenating a body which is capable, by reduction, of producing an aromatic alcohol, in the presence of a catalyst having an atomic weight between 55 and 59, while said body is maintained in a liquid condition, at a temperature not over about 120° C., and while under a pressure of about 10 to 15 atmospheres, while vigorously agitating the reacting mass.

The foregoing specification of my catalytic method of hydrogenation signed by me this third day of July, 1913.

ANDRÉ BROCHET.

Witnesses:
 LUCIEN MEMMINGER,
 RENÉ THIRIOT.